Sept. 27, 1955     H. T. McLEAN     2,718,779

APPARATUS FOR TESTING WEAR RESISTANCE

Filed Oct. 30, 1951

Inventor:
Harold T. McLean,
by Paul A. Frank
His Attorney.

United States Patent Office 2,718,779
Patented Sept. 27, 1955

2,718,779

APPARATUS FOR TESTING WEAR RESISTANCE

Harold T. McLean, Troy, N. Y., assignor to General Electric Company, a corporation of New York Application October 30, 1951, Serial No. 253,845

3 Claims. (Cl. 73—7)

This invention comprises an apparatus for determining the wearing qualities of materials as, for example, the insulating coatings of electric conductors.

In the development of improved insulations for wires, cables, and other electrically insulated conductors, efforts are continually being made to provide coatings of greater toughness and improved wear resistance. The life of electric devices may be determined by the resistance to wear of insulated components which are exposed to abrasion-producing forces. Hence, it is important that the abrasion resistance of various new tough coating and insulating materials should be accurately and quantitatively determined. Devices have been provided heretofore for testing wear resistance by abrasion under constant load or pressure. Devices also have been provided to subject an insulated conductor to abrasion at an increasing load in a given path during a single abrading pass with the object of penetrating the insulation. Such a test does not give the significant statistical data obtained by the present invention.

In accordance with the present invention, the wear resisting characteristics of a given specimen are determined under a loading pressure chosen with respect to the insulation to be tested to be resisted and which progressively increases at a predetermined rate during repeated abrasion strokes over the same area up to the moment that failure eventually results. The present invention provides an apparatus whereby the abrasion resistance of coatings on electric conductors may be more accurately determined than was heretofore possible. The improved apparatus includes mechanism for subjecting a specimen to be tested to successive traversing engagements with an abrading element over a selected path or region on the specimen being tested, the pressure being increased automatically at a selected and predetermined rate of increase. Means is provided for recording both the number of traversions and the ultimate pressure at which failure occurred in a given specimen undergoing test.

Figure 1:
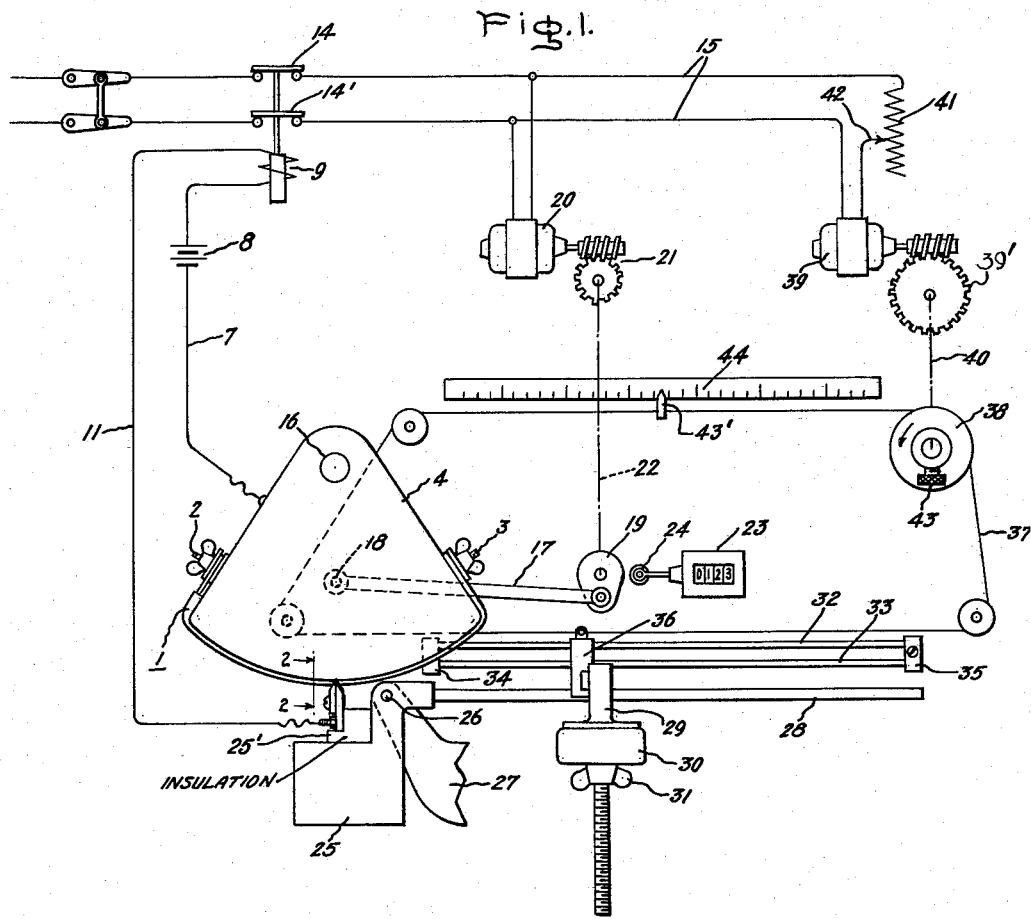
Figure 2:
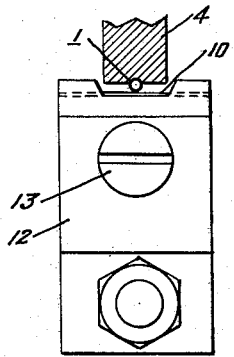
Figure 4:
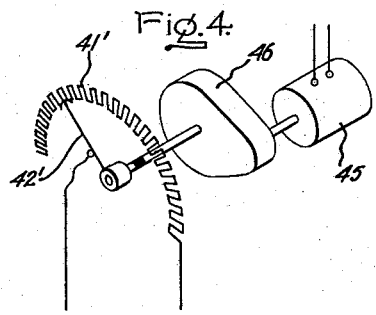
Figure 3:
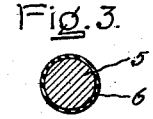

The accompanying Fig. 1 illustrates somewhat diagrammatically in front elevation an embodiment of my invention; Fig. 2 is a fragmental view taken at right angles to the plane of Fig. 1 of a portion of the abrading means and specimen holder; Fig. 3 is a cross section of a specimen of insulated wire to be tested; and Fig. 4 is a fragmental view of a modification.

A specimen of insulated wire 1 to be investigated is clamped by the thumb screws 2, 3 to the lower arcuate face of a pivotally supported rocker 4. As shown in Fig. 2, this face of rocker 4 is provided with a groove to hold the specimen securely in desired position. As shown in Fig. 3, the specimen to be tested includes a metal conductor 5 and a surrounding insulating coating 6. The conductor 5 is electrically connected to the rocker 4 which in turn is connected by the conductor 7 to a battery 8 in series with a solenoid 9. Below the specimen 1 to be tested is an abrading element 10 which bears on the insulation 6 to be tested and is connected by a conductor 11 to the electric battery 8. The abradant element may assume various forms. For example, it may be a steel needle supported on a pedestal 12. As shown in Fig. 2, the needle 10 is clamped in place by tightening the screw 13. When the insulation is worn through at some region on the specimen 1, the circuit through the solenoid 9 is completed. The energized solenoid opens the circuit by raising the switch blades 14, 14' thus deenergizing the energy supply circuit 15 and stopping the apparatus. Of course, the condition of the test specimen also may be determined by inspection short of actual failure.

The metal rocker 4 which is pivoted at 16 is driven in a reciprocating motion by an arm 17. This arm, which is pivotally connected to the rocker 4, as indicated at 18, is connected to an eccentric 19. The latter is rotatably driven by an electric motor 20 through gearing conventionally indicated at 21, the drive shaft being indicated by dash-dot line 22. As the eccentric 19 revolves the revolutions are recorded by a mechanical counter device 23 by the engagement of the eccentric 19 with the counter push rod 24.

The reciprocating passages of the specimen over the abradant element 10 wears away the insulation until at some area the metal conductor becomes exposed, the solenoid 9 is energized and the circuit 15 is opened. The abrading element and its support 12 is electrically insulated from the metal block 25 as indicated at 25'. The block 25 is pivoted at 26 on a support 27 indicated in part broken away. Also attached to the block 25 is a horizontal rod 28 on which a slider 29 can travel. A weight 30 is attached to the slider 29 by a thumbscrew 31. Additional weights may be attached if desired.

Guide rods 32 and 33 are attached rigidly to the frame (not shown) of the device by the plates 34, 35. These rods carry a second slider 36 which engages with the slider 29 when traveling from left to right. The slider 36 is moved laterally by an endless belt 37 which passes over a driven drum 38. The latter is driven by a motor 39 connected to the drum 38 by a shaft 40 through gearing 39'. The motor 39 is energized by connection to the mains 15 in series with resistor 41 to which it is connected by a movable switch 42. The drum 38 is secured to the motor-driven shaft 40 by a clamp 43 which, if disengaged, allows the sliders 29 and 36 to return to the left end or initial position of their travel. At the extreme left the metal block 25 counterbalances the weight of the rod 28; hence in the absence of the weight 30 and its slider 29 substantially no pressure would be exerted by the abrading tool 10 on the specimen to be tested. When the slider 29 and weight 30 are applied, the abrading tool 10 initially presses against the specimen by a force measured by their combined weight.

When the motors 20 and 39 are started simultaneously, the rocker 4 is activated, scraping the specimen over the abradant by a reciprocating motion, the pressure being determined by weight 30. At the same time the drum 38 revolves and draws the slider 36 to the right on the bar 28 thereby increasing the leverage of the weight and progressively increasing the force whereby the abrading tool 10 presses on the specimen.

Abrasion of the insulation on the specimen 1 continues at increasing load as the weight 30 moves to the right along the rod 28. When the insulation on specimen 1 is worn through at some region, the circuit of the conductors 7, 11 is completed thereby, as previously indicated, stopping further operation of the apparatus.

The abrasion resistance of the specimen will be determined by the number of reciprocations of the holder 4 as indicated by the counter 23 and also by the distance which the slider has traveled outwardly on the bar 28, which may be indicated by the travel of a pointer 43' on a scale 44.

The rate at which the abrasion load increases or, in other words, the rate at which the force with which the abrading tool is pressed on the specimen undergoing test is increased, can be varied in a number of ways. For example, the speed of the motor 39 driving the drum 38 may be varied by increasing or decreasing the resistance 41 in the motor circuit. Also the drum 38 may be replaced by a drum of smaller or of larger radius, thereby increasing or decreasing the rate of travel of the weight 30 on the slider 28.

Fig. 4 illustrates one means for progressively changing the speed of the motor 39 and thereby controlling at a predetermined variable rate the increase of pressure of the abrading element. The resistor 41 of Fig. 1 here is replaced by a resistor 41' which is arranged in arcuate form and has variable resistivity. As the switch arm 42' is moved clockwise over the resistor 41', the resistance in the circuit of a separately energized driving motor 45 is decreased progressively at a rate controlled by the predetermined resistance pattern of the resistor 41'. The rate of pressure increase will progressively rise. By proportioning the resistance in a selected manner, the rate of pressure increase may be decreased or slowed. The switch arm is connected to the motor 45 by a speed-varying gear mechanism 46 which likewise can be made adjustable to controllably vary the speed of travel of the switch arm 42'. By the described means, the rate of increase of pressure of the abrading tool may be made straight line, or according to other chosen function, or logarithmic or any other desired rate.

Various changes may be made without departing from my invention. Thus, the specimen being tested may be mounted in distorted position, for example, a conductor flat or round may be spirally distorted thus bringing different parts of its circumference into contact with the abrading tool.

The abrading tool can be varied in shape and composition. For example, it may be chosen to have a metallic edge of negligible radius or a metallic edge of large radius. The abrading element which engages with the specimen being tested may consist of a part of the same material or wire undergoing test. The results of tests under those various conditions will have specific significance in determining the toughness or abrasion characteristic of a specimen depending on the kind of service and other conditions expected of the materials undergoing test.

Although my invention has been described with particular reference to the testing of coating materials and in particular electrical insulation, I wish it to be understood that the wear resisting properties of various kinds of sheet materials may be tested in a similar manner. The abrasion tool will be appropriately varied in such case, for example, to present a spherical or flat abrading surface. The means for clamping a test specimen also may be appropriately adapted to the nature of the material to be tested.

What I claim as new and desire to secure by Letters Patent of the United States is:

1. An apparatus for testing the wear resistance of a material which consists of a holder, means for clamping a specimen to be tested on said holder, an abrading element, means for causing said abrading element to engage under pressure with the specimen, means for producing repeated relative traversing engagement between said element and the specimen in a direction lengthwise of the specimen, means for increasing progressively the pressure of said element on the specimen and means for predetermining the rate of increase of said pressure.

2. An apparatus for testing toughness of an insulating coating on an electrical conductor comprising the combination of means for holding fixedly a specimen of the electrical conductor to be tested, an abradant element, means for exerting pressure between the specimen and said abradant element, means for producing a plurality of relative traversing engagements between a selected surface of the coating and said abradant element, means for progressively increasing the pressure under which said engagements occur, means for indicating the pressure at which failure occurs of the coating on the specimen and means whereby the number of traversions required to effect such failure are recorded.

3. An apparatus for testing the wear resistance of insulation on an electric conductor comprising the combination of a pivotally supported holder having an arcuate-shaped engaging surface, means for securing a length of conductor upon the engaging surface of said holder, means for supporting an abrading device in contact making position with respect to the insulation on the conductor, means for reciprocally rocking said holder to cause traversions of said abrading device over a fixed surface of the insulation, means for exerting pressure between the insulation and said abrading device and means for automatically increasing said pressure at a predetermined rate during the progress of said traversions.

References Cited in the file of this patent
UNITED STATES PATENTS

| Number | Name | Date |
| --- | --- | --- |
| 895,980 | Derihon | Aug. 11, 1908 |
| 1,581,215 | Kobin | Apr. 20, 1926 |
| 2,079,591 | Bartell | May 11, 1937 |
| 2,171,026 | Curtis | Aug. 29, 1939 |
| 2,372,093 | Leape et al. | Mar. 20, 1945 |
| 2,373,115 | Graves | Apr. 10, 1945 |
| 2,582,223 | Blackburn et al. | Jan. 15, 1952 |